United States Patent
Sundgren et al.

(10) Patent No.: US 7,073,259 B2
(45) Date of Patent: Jul. 11, 2006

(54) APPARATUS AND METHOD FOR MANUFACTURING AN AUTOMOTIVE BEAM

(75) Inventors: Anders Sundgren, Sunderbyn (SE); Göran Berglund, Gammelstad (SE); Mats Lindberg, Luleå (SE)

(73) Assignee: Accra Teknik AB, Ojebyn (SE)

( * ) Notice: Subject to any disclaimer, the term of this patent is extended or adjusted under 35 U.S.C. 154(b) by 31 days.

(21) Appl. No.: 10/481,317

(22) PCT Filed: Jun. 3, 2002

(86) PCT No.: PCT/SE02/01055

§ 371 (c)(1),
(2), (4) Date: Feb. 25, 2004

(87) PCT Pub. No.: WO03/000440

PCT Pub. Date: Jan. 3, 2003

(65) Prior Publication Data

US 2004/0154158 A1    Aug. 12, 2004

(30) Foreign Application Priority Data

Jun. 21, 2001  (SE) .................................. 0102240

(51) Int. Cl.
*B23P 17/00* (2006.01)
(52) U.S. Cl. ..................... 29/897.35; 29/897.2; 29/779; 228/17.5; 228/146; 228/150; 72/369
(58) Field of Classification Search ............... 29/897.2, 29/779, 897.35; 228/17, 17.5, 146, 150; 72/166, 168, 384, 379.2, 367–372, 181–182, 72/171, 178
See application file for complete search history.

(56) References Cited

U.S. PATENT DOCUMENTS

| 3,362,056 A | * | 1/1968 | Preller et al. ............ 29/897.35 |
| 3,783,498 A | * | 1/1974 | Moyer et al. ............... 228/147 |
| 4,554,718 A | * | 11/1985 | Ollinger et al. .......... 52/506.07 |
| 5,454,504 A | * | 10/1995 | Sturrus ........................ 228/17 |
| 5,545,022 A | | 8/1996 | Rosasco |

(Continued)

FOREIGN PATENT DOCUMENTS

DE           4438869 A1       5/1996

(Continued)

OTHER PUBLICATIONS

DE 4438869 Derwent English Abstract. 1996.*

(Continued)

*Primary Examiner*—Eric Compton
(74) *Attorney, Agent, or Firm*—Ware, Fressola, Van der Sluys & Adolphson LLP

(57) ABSTRACT

In an apparatus and method for manufacturing an automotive beam for use as a beam in structural components of automobiles, the beam is provided with significant improvements in terms of torsional rigidity and yield strength. The beam improves the overall safety of passengers and maintains the simplicity of the manufacturing process. The apparatus (1) for manufacturing roll formed profile beams comprises a plurality of material dispensers (2,6), a first set of rollers (5), a second set of rollers (11), a first welding station (10) mounted between the two sets of rollers (5, 11) and a second welding station (12) at the outlet of the second set of rollers (11). The method of manufacturing roll formed profile beams comprises the steps of roll forming a first profile element followed by roll forming a second profile element enclosing the first profile element and forming a closed profile beam having an internal support structure.

22 Claims, 3 Drawing Sheets

U.S. PATENT DOCUMENTS

| | | | |
|---|---|---|---|
| 5,566,874 A | 10/1996 | Sturrus | |
| 5,640,869 A | 6/1997 | Takeda et al. | |
| 5,829,666 A * | 11/1998 | Takeda et al. | 228/147 |
| 5,934,544 A | 8/1999 | Lee et al. | |
| 6,020,039 A * | 2/2000 | Cline et al. | 428/36.9 |
| 6,141,935 A * | 11/2000 | Artner et al. | 52/735.1 |
| 6,217,089 B1 * | 4/2001 | Goto et al. | 293/102 |
| 6,325,431 B1 * | 12/2001 | Ito | 293/102 |
| 6,360,441 B1 * | 3/2002 | Himsl et al. | 29/897.2 |
| 6,485,072 B1 * | 11/2002 | Werner et al. | 293/132 |
| 6,592,158 B1 * | 7/2003 | Kettler et al. | 293/120 |
| 6,688,661 B1 * | 2/2004 | Yamamoto | 296/102 |
| 6,814,380 B1 * | 11/2004 | Yoshida et al. | 293/120 |

FOREIGN PATENT DOCUMENTS

| | | | |
|---|---|---|---|
| FR | 7504120 A | | 10/1975 |
| JP | 07-172253 | * | 7/1995 |
| JP | 2001-1053 A | | 1/2001 |
| WO | WO 97/30882 A1 | | 8/1997 |

OTHER PUBLICATIONS

Database WPI, Week 2000117, Derwent Publications, Ltd., London, GB; Q 17 & JP 2001001053 A (Aisin.Seiki KK) Jan. 9, 2001, abstract; figures 1-4.

* cited by examiner

APPARATUS AND METHOD FOR MANUFACTURING AN AUTOMOTIVE BEAM

BACKGROUND OF THE INVENTION

1. Technical field

The present invention relates to an apparatus and method for manufacturing an automotive beam and in particular to an apparatus and method for roll forming a closed profile beam.

2. Description of the Background Art

Beams used on the body structure of an automobile and beams mounted at the front and rear of automobiles are required to absorb impact from collisions with other vehicles and with other objects. Beams manufactured for these purposes need to have a high resistance to torsion and good strength characteristics in order to prevent local buckling of the beam. A number of prior art patent and patent application specifications have disclosed beams for use in the automotive industry and apparatuses and methods for manufacturing such beams.

U.S. Pat. No. 5,934,544 provides an apparatus and method for manufacturing automotive bumper beams by a single roll forming process. The apparatus includes an uncoiler, a straightner, a group of roll formers, a sweep roll former, a welding member and a cutting member. The method of manufacturing the bumper beam includes preparing the sheet metal, forming the cross sectional profile, forming a sweep, adjusting the tubular cross sectional shape of the sheet metal and welding the sheet metal prior to cutting the beam into desired lengths. The objects of the invention are to provide a beam with strengthened impact resistance, reduced weight and to simplify the manufacturing processes of the prior art.

WO 97/30882 (International Patent Application No. PCT/SE97/00305) discloses a vehicle body comprising a beam structure consisting of thin-walled flange-free profile parts with closed cross sections made by means of roll forming. The component parts of the beam structure are hardened so that the boron steel or other high tensile steel has a yield limit of the order of 900–1100 MPa. The object of the invention is to produce a new and lighter type of vehicle body with an increased body strength and stiffness.

In order to maintain an efficient manufacturing process for beams, it is important to use a production line technique manufacturing beams in a relatively small number of steps while maintaining their structural integrity and safety characteristics. The safety and structural integrity aspects are particularly important when the beams are manufactured for use as protective members in an automobile. Although the techniques disclosed in the above referenced specifications maintain an efficient manufacturing process and address the issues of improved strength characteristics and weight of the beam, significant improvements could still be made regarding the safety aspects of beams for use in automobiles which would inevitably result in improvements to human safety.

SUMMARY OF THE INVENTION

It is an object of the present invention to provide a beam for use in structural components of automobiles with significant improvements in terms of torsional rigidity and yield strength to improve the overall safety of passengers travelling in such automobiles in addition to maintaining the simplicity of the manufacturing process.

The present invention provides an apparatus for manufacturing roll formed profile beams characterized in that the apparatus comprises a plurality of material dispensers, a first set of rollers and a second set of rollers and a first welding station mounted between and being in communication with the two sets of rollers and a second welding station in communication with the outlet of the second set of rollers, wherein one dispenser is in communication with the inlet of the first set of rollers and another dispenser is in communication with the inlet of the first welding station.

Preferably, the material dispensers are provided by uncoilers each carrying a coil of sheet material.

Ideally, the sheets are manufactured from high strength steel. Steel provides the desired characteristics for beams to be used in the automotive industry as impact absorbers.

In one embodiment, the sheets are made from the same steel.

In another embodiment, the sheets are manufactured from different steels. This allows the manufacturer greater flexibility and allows for the manufacture of beams of different strength characteristics depending on their specified end-use.

In a particularly preferred embodiment, the sheet material is boron steel. Hardened boron steel has a yield limit of the order of 900–1100 MPa and is a particularly suitable for beams used in the automotive industry.

Although the present invention describes a preferred embodiment utilizing steel and in particular high strength boron steel, it will of course be appreciated that other steels or metal alloys providing desired characteristics regarding torsional rigidity and strength could also be used.

In one embodiment, the sheets of material have the same thickness.

In another embodiment, the sheets of material have different thicknesses. Again this provides flexibility for the manufacturer and the end user.

In a further aspect of the invention, the sheet material defines pre-punched apertures at predefined locations. Both sheet materials or only one sheet may be pre-punched which results in a reduction of weight to the overall beam structure. Additionally, the pre-punched holes may act as ventilation for the beam during the heat treatment procedures.

An apparatus for manufacturing roll formed closed profile beams comprising a first dispenser carrying a roll of sheet material, a first group of rollers for forming the sheet into a predefined profile in communication with both the first dispenser and a first welding station, a second dispenser carrying a second roll of sheet material in communication with a first welding station, wherein the first welding station welds the profile element formed by the first group of rollers onto a predefined location on the sheet fed from the second dispenser, a second group of rollers for receiving the newly welded profile element and sheet from the first welding station and for forming the sheet around the first formed profile element by bringing the longitudinal free edges of the sheet to a meeting point enclosing the first profile element and a second welding station for welding the longitudinal free edges together with a surface of the first profile element to form a closed profile beam having an internal support structure.

The present invention also provides a method of manufacturing roll formed profile beams characterized in that the method comprises the steps of roll forming a first profile element 30 followed by roll forming a second profile element enclosing the first profile element and forming a closed profile beam having an internal support structure.

Ideally, the first profile element is formed as an internal support profile.

In one embodiment, the profile element is substantially U-shaped having a base and a pair of legs extending substantially perpendicularly from the base in the same direction as one another.

In a further embodiment, the legs of the profile element include ribs. The ribs improve the strength of the profile element.

Ideally, the internal support profile element is welded to a second sheet material at a welding station.

Preferably, the second sheet material is subsequently roll formed into a beam enclosing the first profile element.

Ideally, the second profile element is closed around the first profile element by welding the longitudinal ends of the second profile element together with a portion of the first profile element.

Ideally, the first profile element is welded to the second sheet by means of seam welding.

Preferably, the two longitudinal edges of the second profile element are laser welded together with a portion of the second profile element.

A method for forming closed profile beams comprising the steps of;

dispensing a first sheet from a first dispenser to a first set of rollers, forming the sheet to a predefined profile and feeding the profile element to a first welding station, dispensing a second sheet from a second dispenser to the first welding station, welding the profile element to the second sheet at the first welding station, feeding the newly formed sheet and profile element to a second set of rollers, forming the sheet by bringing the free longitudinal edges of said sheet to a meeting point thereby enclosing the first profile element feeding the workpiece to a second welding station and welding the longitudinal free edges of the second sheet together with a surface of the first profile element to form a closed profile beam having an internal support structure.

The invention will now be described with reference to the accompanying drawings, which show, by way of example only, one embodiment of an apparatus and method for manufacturing an automotive beam in accordance with the invention. In the drawings:—

DETAILED DESCRIPTION OF THE INVENTION

Figure 1:
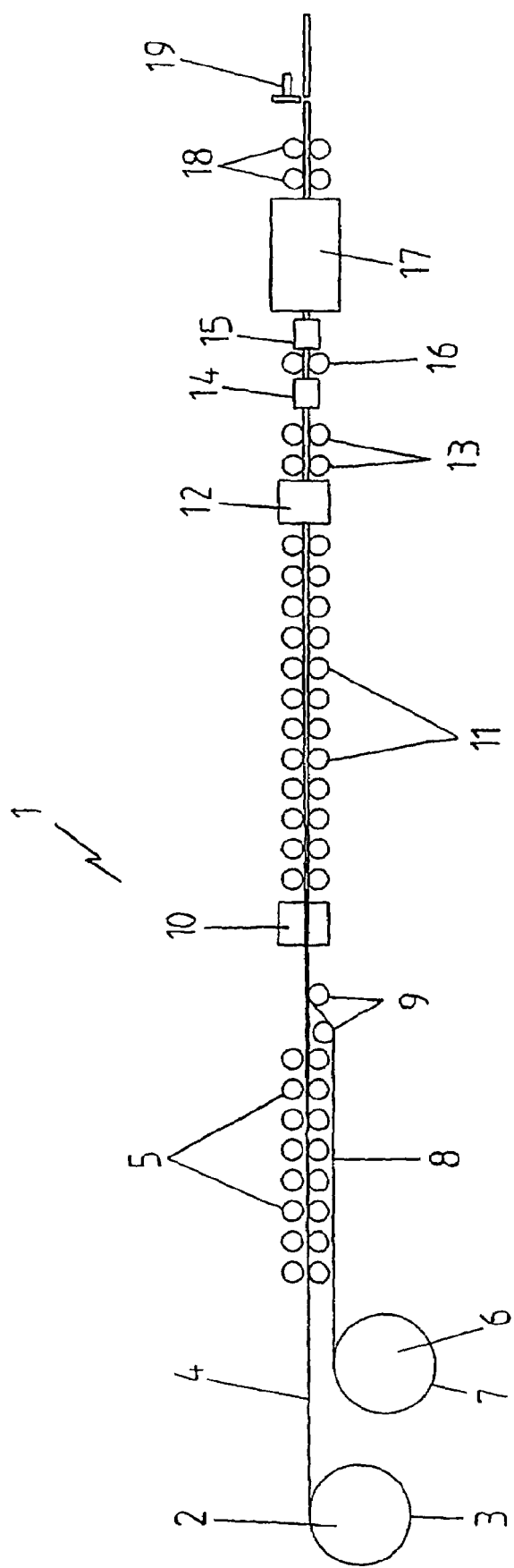
FIG. 1 is a schematic drawing showing an elevation view of the apparatus.

Referring to the drawings and initially to FIG. 1 there is shown an apparatus for manufacturing automotive beams indicated generally by the reference numeral 1. A first dispenser 2 contains a coil of sheet material 3 and a first sheet 4 extends from the first dispenser 2 to a first set of forming rollers 5. A second dispenser 6 contains a second coil of sheet material 7 and a second sheet 8 extends from the second dispenser 6 to a first set of support rollers 9. A first welding station 10 is located between the first set of forming rollers 9 and a second set of forming rollers 11. A second welding station 12 is mounted between the second set of forming rollers 11 and a second set of support rollers 13. An induction warming oven containing two separate ovens 14 and 15 is mounted either side of a third set of support rollers 16 and the outlet of the separate oven 15 leads to a quenching station 17. A set of stretching rollers 18 are mounted between the quenching station 17 and a knife 19, which is the final station in the production line apparatus 1.

Figure 2:
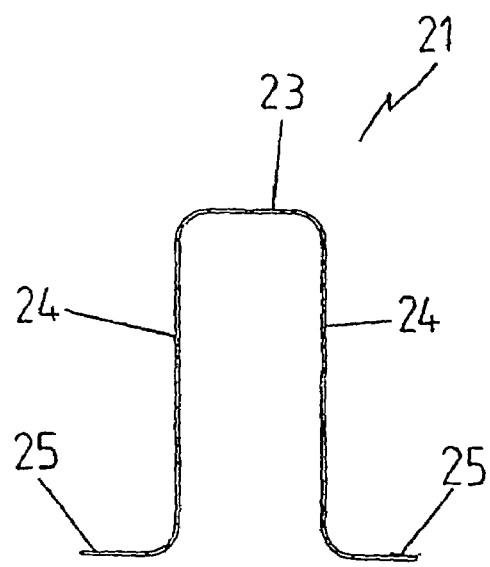
FIG. 2 is an end view of a first profile element in accordance with the invention.

Referring to FIG. 2 there is shown a first profile element indicated generally by the reference numeral 21. The profile element 21 is substantially U-shaped having a base 23 and a pair of legs 24 extending substantially perpendicularly from the base 23 in the same direction as one another. Each leg 24 terminates with an integrally formed flange 25, the flanges 25 extending in opposite directions to each other and in a plane parallel with the base 23.

Figure 3:
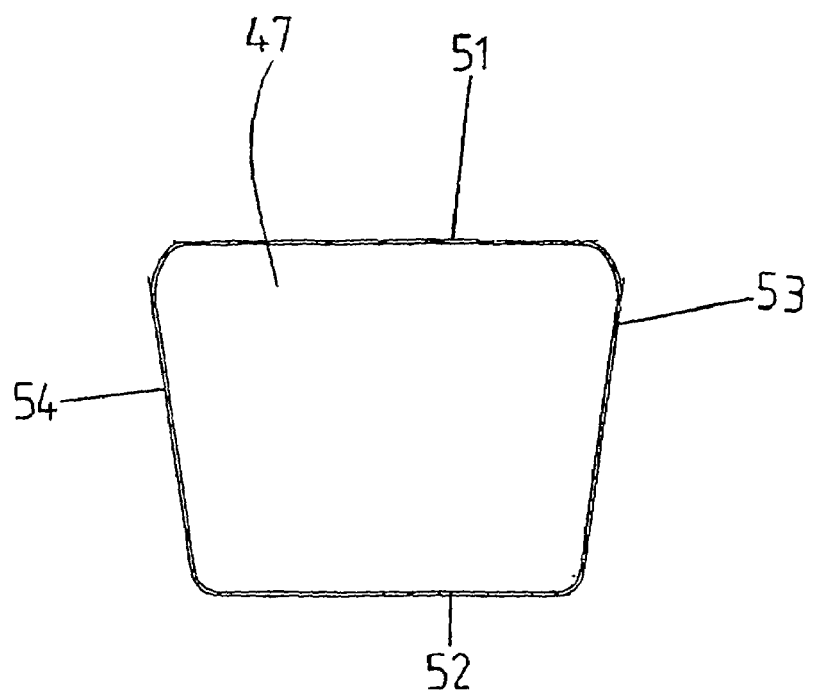
FIG. 3 is an end view of a second profile element in accordance with the invention.

Referring to FIG. 3, the second profile element 47 is shown having two parallel sides 51, 52 connected by two sides 53, 54 forming a tubular closed profile element 47.

Figure 4:
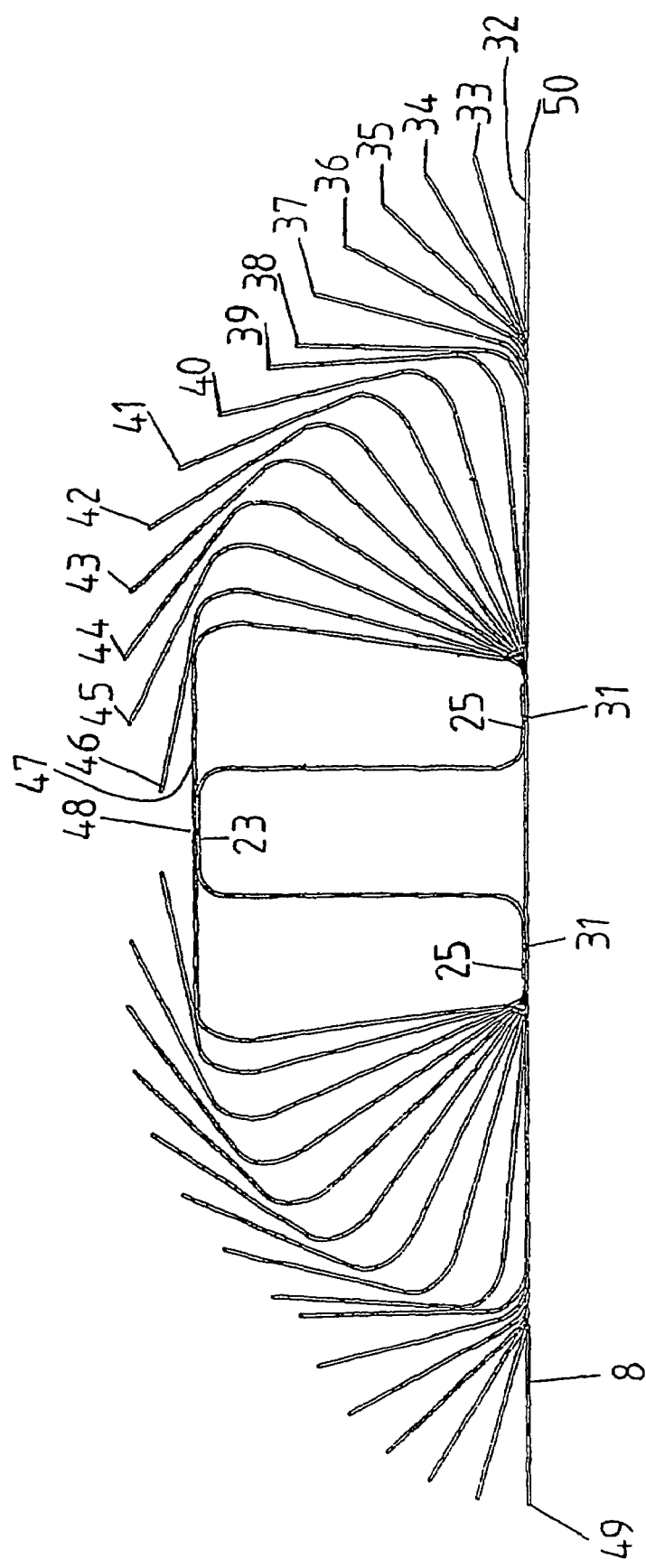
FIG. 4 is a schematic end view of the second roll forming process step by step.

In FIG. 4, there is shown a step by step view of the roll forming process which occurs between the first welding station 10 and the second welding station 12 (see FIG. 1). Two weld joints 31 are shown between the flanges 25 of the profile element 21 and the second sheet 8. A number of stages of the roll forming process from 32, in which the second sheet 8 is in a flat orientation, to 47 in which the second sheet 8 is formed as a second profile element 47 enclosing the profile 21 are shown. A third weld joint 48 is shown between the longitudinal edges 49, 50 of the sheet 8 and the base 23 of the profile element 21.

In use, a first sheet 4 extends from a first dispenser 2 to a first set of rollers 5 which form the sheet 4 to a predefined profile. The profile element 21 is fed from the first set of rollers 5 to the first welding station 10. The second sheet of metal 8 is dispensed from the second dispenser 6 to the first welding station 10 via the first set of support rollers 9. The profile element 21 is welded to the second sheet of metal 8 at the first welding station 10. The newly combined profile element 21 and sheet 8 is fed to the second set of rollers 11 which form the sheet 8 by bringing the free longitudinal edges 49, 50 of the second sheet of metal 8 to a meeting point thereby enclosing the first profile element 21. The forming process is completed when the work-piece is fed to a second welding station 12 and the longitudinal free edges 49, 50 of the second sheet 8 are welded together with the base 23 of the first profile element 21 to form a closed profile beam having an internal support structure.

It will of course be understood that the invention is not limited to the specific details as herein described, which are given by way of example only, and that various alterations and modifications may be made without departing from the scope of the invention as defined in the appended claims.

The invention claimed is:

1. An apparatus for manufacturing roll formed profile beams comprising:
   (a) a first material dispenser for dispensing a first material;
   (b) a first set of rollers having an inlet in communication with the first material dispenser to receive the first material being dispensed therefrom, the first set of rollers being adapted to form the first material into a first profile element having a predefined cross-sectional profile;
   (c) a second material dispenser for dispensing a second material adjacent the first material at an outlet of the first set of rollers;

(d) a first welding station for welding the first material to the second material adjacent thereto;

(e) a second set of rollers for receiving the welded first and second materials from the first welding station, the second set of rollers being adapted to form the second material into a second profile element having a predefined cross-sectional profile which encloses the first profile element; and (f) a second welding station in communication with an outlet of the second set of rollers for welding portions of the second material together as the welded first and second materials exit from the outlet of the second set of rollers to form a closed profile beam.

2. An apparatus as claimed in claim 1, wherein the first material dispenser is provided by an uncoiler and the first material is a coil of sheet material carried by the first material dispenser.

3. An apparatus as claimed in claim 2, wherein the second material dispenser is provided by an uncoiler and the second material is a coil of sheet material carried by the second material dispenser.

4. An apparatus as claimed in claim 1, wherein the second material dispenser is provided by an uncoiler and the second material is a coil of sheet material carried by the second material dispenser.

5. An apparatus as claimed in claim 1, wherein the first and second materials are sheet materials.

6. An apparatus as claimed in claim 5, wherein the sheet materials are high strength steel.

7. An apparatus as claimed in claim 6, wherein the steel is boron steel.

8. An apparatus as claimed in claim 6, wherein the first and second materials are made from the same steel.

9. An apparatus as claimed in claim 6, wherein the first and second materials are manufactured from different steels.

10. An apparatus as claimed in claim 5, wherein the sheet materials have the same thickness.

11. An apparatus as claimed in claim 5, wherein the sheet material has different thicknesses.

12. An apparatus as claimed in claim 5, wherein at least one of the sheet materials defines pre-punched apertures at predetermined locations.

13. An apparatus as claimed in claim 5, wherein the sheet materials define pre-punched apertures at predetermined locations.

14. A method of manufacturing roll formed profile beams comprising the steps of: roll forming a first sheet material travelling in a path into a first profile element having a predefined cross-sectional profile followed by roll forming a second sheet material travelling in a path into a second profile element having a predefined cross-sectional profile which encloses the first profile element to form a closed profile beam.

15. A method as claimed in claim 14, wherein the first profile element is formed as an internal support profile.

16. A method as claimed in claim 14, wherein the first profile element is a substantially U-shaped profile.

17. A method as claimed in claim 16, wherein legs of the substantially U-shaped profile element include ribs.

18. A method as claimed in claim 14, wherein, during roll forming of the second profile element, a second sheet is roll formed into the second profile element enclosing the first profile element.

19. A method as claimed in claim 18, wherein, prior to the roll forming of the second profile element, the first profile element is welded to the second sheet at a welding station.

20. A method as claimed in claim 19, wherein the first profile element is welded to the second sheet by means of seam welding.

21. A method as claimed in claim 14, further comprising the step of welding longitudinal edges of the second profile element together with a portion of the first profile element thereby enclosing the first profile element within the second profile element.

22. A method as claimed in claim 21, wherein the longitudinal edges of the second profile element are laser welded together with the portion of the first profile element.

* * * * *